(12) United States Patent
Kim

(10) Patent No.: US 10,202,959 B2
(45) Date of Patent: Feb. 12, 2019

(54) COMBUSTION PRE-CHAMBER AND METHOD FOR OPERATING SAME

(71) Applicant: Caterpillar Inc., Peoria, IL (US)

(72) Inventor: Charlie Kim, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 43 days.

(21) Appl. No.: 15/139,077

(22) Filed: Apr. 26, 2016

(65) Prior Publication Data
US 2017/0306917 A1     Oct. 26, 2017

(51) Int. Cl.
| F02P 17/02 | (2006.01) |
|---|---|
| F02B 19/14 | (2006.01) |
| F02B 19/10 | (2006.01) |
| F02D 41/00 | (2006.01) |
| F02M 26/20 | (2016.01) |

(52) U.S. Cl.
CPC .......... F02P 17/02 (2013.01); F02B 19/108 (2013.01); F02B 19/14 (2013.01); F02D 41/0002 (2013.01); F02M 26/20 (2016.02); F02D 2041/001 (2013.01)

(58) Field of Classification Search
CPC ............ F02D 19/0644; F02D 19/0647; F02D 41/0002; F02D 41/0027; F02D 41/3035–41/3047; F02D 2041/001; F02M 21/0206; F02M 21/0209; F02B 19/10–19/1085; F02B 19/12; F02B 19/14; F02B 2275/32; F02P 17/02; Y02T 10/128
See application file for complete search history.

(56) References Cited

U.S. PATENT DOCUMENTS

| 3,941,105 | A |   | 3/1976  | Yagi et al. |
|---|---|---|---|---|
| 4,004,554 | A | * | 1/1977  | Kosaka ............... F02B 43/10 123/25 R |
| 4,016,846 | A |   | 4/1977  | Nakano et al. |
| 4,020,808 | A |   | 5/1977  | Yagi et al. |
| 4,140,090 | A | * | 2/1979  | Lindberg ............ F02B 19/108 123/1 A |
| 5,611,307 | A | * | 3/1997  | Watson ............... F02B 19/1014 123/254 |
| 6,463,907 | B1 | * | 10/2002 | Hiltner ................. F02B 1/12 123/27 R |

(Continued)

OTHER PUBLICATIONS

Blank, "CNG/Methane-Combustion in a Homogeneous-Combustion Radical-Ignition D.I. Diesel Engine", SAE paper No. 2007-01-0047, published Jan. 23, 2007.*

(Continued)

*Primary Examiner* — John Zaleskas
(74) *Attorney, Agent, or Firm* — Leydig, Voit & Mayer, Ltd.

(57) ABSTRACT

A method for operating an internal combustion engine includes operating at least one cylinder pre-chamber in a homogeneous charge compression ignition (HCCI) combustion mode by providing an air/fuel mixture in the pre-chamber that is fluidly connected to the at least one engine cylinder, creating H and OH radicals in the pre-chamber to achieve an ignition in the at least one pre-chamber, determining whether an ignition timing is advanced or delayed relative to a desired timing, and delaying the ignition when the ignition is advanced relative to the desired timing by cooling the pre-chamber and the at least one engine cylinder.

7 Claims, 4 Drawing Sheets

(56) References Cited

U.S. PATENT DOCUMENTS

| | | | |
|---|---|---|---|
| 6,739,289 B2* | 5/2004 | Hiltner | F02B 43/10 123/253 |
| 6,883,468 B2 | 4/2005 | Lehman | |
| 8,567,369 B2* | 10/2013 | Johnson | F02B 19/1009 123/260 |
| 9,243,537 B1* | 1/2016 | Ge | F01N 13/009 |
| 2006/0225673 A1* | 10/2006 | Linderyd | F02B 1/12 123/27 R |
| 2007/0235002 A1* | 10/2007 | Blank | F02B 11/00 123/275 |
| 2008/0283022 A1* | 11/2008 | Kim | F02B 17/005 123/25 R |
| 2011/0232589 A1* | 9/2011 | Blank | F02B 19/10 123/3 |
| 2012/0118263 A1* | 5/2012 | Patterson | F02B 19/06 123/304 |
| 2012/0227397 A1* | 9/2012 | Willi | F02B 37/00 60/605.1 |
| 2012/0253640 A1* | 10/2012 | Nada | F02D 41/403 701/103 |
| 2013/0019841 A1* | 1/2013 | Ando | F02D 41/3041 123/406.12 |
| 2013/0306045 A1* | 11/2013 | Blank | F01C 1/22 123/575 |
| 2015/0361876 A1* | 12/2015 | Schilir | F02B 43/10 60/605.1 |
| 2016/0195007 A1* | 7/2016 | Kim | F02B 43/10 123/254 |
| 2016/0195041 A1* | 7/2016 | Kim | F02M 25/14 123/254 |
| 2016/0265416 A1* | 9/2016 | Ge | F02B 19/10 |
| 2017/0074184 A1* | 3/2017 | Kim | F02D 41/0077 |

OTHER PUBLICATIONS

Westbrook, C.K. and Dryer, F.L., "Chemical Kinetic Modeling of Hydrocarbon Combustion", Prog. Energy Combust. Sci. 1984, vol. 19, pp. 1-57.*

Blank, David A., "Hydrogen Lean-Combustion Studies in a Four-Stroke DI Radical-Ignition Diesel Engine with EGR," 2007, SAE 2007-01-1887.*

Ditiu, "Triple Stratification in a Spark Ignition Engine: The Effect on the Emission at Unthrottled Light Load," abstract of SAE Technical Paper 1999-01-0575, Mar. 1, 1999, 1 p., downloaded from the Internet at http://papers.sae.org/1999-01-0575/ on Apr. 26, 2016.

* cited by examiner

COMBUSTION PRE-CHAMBER AND METHOD FOR OPERATING SAME

TECHNICAL FIELD

The present disclosure relates generally to reciprocating internal combustion engines and, more particularly, to system and method for controlling engine operation under homogeneous charge compression ignition (HCCI) conditions.

BACKGROUND

Reciprocating internal combustion (IC) engines are known for converting chemical energy from a fuel supply into mechanical power. An air/fuel mixture is received in a variable volume of an engine cylinder, where it is compressed and burned. The burning mixture expands, thus providing mechanical work. The mechanical work produced by one or more engine cylinders is collected by various mechanisms and used to rotate a shaft, which provides useful engine work.

The expanding air/fuel mixture becomes exhaust gas after the burn has completed, which exhaust gas can include various chemical constituents including nitrogen oxides (NOx), unburned hydrocarbons (UHCs), and particulate matter (PM). The amount or concentration of such and other constituents that are produced as a byproduct of engine operation may be subject to government regulation.

One type of engine operation that has been known to yield reduced amounts of undesired exhaust constituents is HCCI, which is known to produce a more complete burn that traditional engines, and at a relatively lower temperature. While the various characteristics of HCCI combustion are preferred for the reduced emissions that are produced, HCCI combustion is typically difficult to control in a real-world application where temperature variations and transient engine operating conditions are the norm.

SUMMARY

In one aspect, the disclosure describes an internal combustion engine. The internal combustion engine includes a cylinder case forming at least one cylinder, which slidably supports a piston and defines therein a variable volume. A head is connected to the cylinder case and disposed to close an end of the at least one cylinder. A pre-chamber is formed in the head and is fluidly connected with the variable volume. A fuel supply is associated with the pre-chamber and configured to selectively provide a fuel into the pre-chamber. A variable valve activation device is configured to selectively activate at least one intake valve associated with the variable volume. The at least one intake valve is arranged to fluidly connect or block the variable volume with an intake duct. At least one exhaust valve is associated with the variable volume and arranged to fluidly connect or block the variable volume with an exhaust duct. An exhaust gas passage fluidly connects the exhaust duct with the variable volume. The exhaust gas passage includes an exhaust gas recirculation (EGR) valve selectively controlling a flow of EGR gas through the exhaust gas passage. A pressure sensor is fluidly associated with the variable volume. The pressure sensor provides a pressure signal indicative of a fluid pressure within the variable volume. An electronic controller is associated with the fuel supply, the variable valve activation device, the pressure sensor, and the EGR valve.

In one disclosed embodiment, the electronic controller is programmed and operates to determine an ignition timing in the variable volume based on the pressure signal, compare the ignition timing with a desired timing to determine whether the ignition timing is advanced or delayed relative to the desired timing. When the electronic controller determines that the ignition timing is advanced relative to the desired timing, the electronic controller causes a delay in the ignition timing by causing a cooling in the variable chamber.

In another aspect, the disclosure describes A method for operating an internal combustion engine includes operating at least one cylinder pre-chamber in a homogeneous charge compression ignition (HCCI) combustion mode by providing an air/fuel mixture in the pre-chamber that is fluidly connected to the at least one engine cylinder, creating H and OH radicals in the pre-chamber to achieve an ignition in the at least one pre-chamber, determining whether an ignition timing is advanced or delayed relative to a desired timing, and delaying the ignition when the ignition is advanced relative to the desired timing by cooling the pre-chamber and the at least one engine cylinder.

DETAILED DESCRIPTION

Aspects of the disclosure will now be described in detail with reference to the drawings, wherein like reference numbers refer to like elements throughout, unless specified otherwise.

Figure 1:
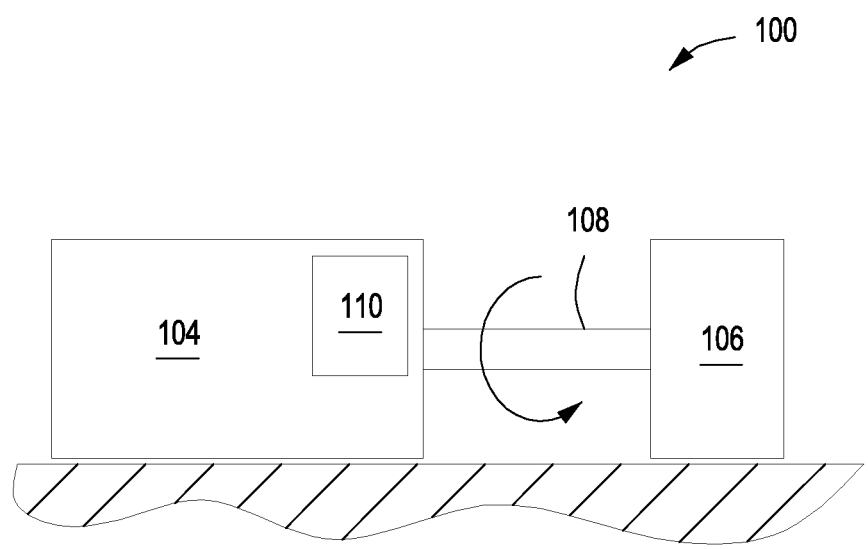
FIG. 1 is a schematic view of a machine in accordance with the disclosure.

FIG. 1 shows a schematic view of a machine 100, according to an aspect of the disclosure. The machine 100 includes an internal combustion (IC) engine 104 that is operatively coupled to a load 106 via a shaft 108. The engine 104 may be a reciprocating internal combustion engine, such as a compression ignition engine or a spark ignition engine. The load 106 may include an electric generator, a compressor, a pump, or combinations thereof. Alternatively or additionally, the load 106 may include a work implement, such as a dump bed, a shovel, a drill, a fork lift, a feller buncher, a conveyor, or any other implement known in the art for performing work on a load.

The machine 100 includes a controller 110 operatively coupled to the engine 104 for control thereof. It will be appreciated that the controller 110 may control various components and systems of the engine based on open-loop or closed-loop control actions in response to inputs from operator input devices, sensors, operating maps stored therein, combinations thereof, or any other control inputs known in the art.

The machine 100 can be an over-the-road vehicle such as a truck used in transportation or may be any other type of machine that performs some type of operation associated with an industry such as mining, construction, farming, transportation, or any other industry known in the art. For example, the machine 100 may be an off-highway truck, an on-highway truck, a railway locomotive, a marine vehicle, an earth-moving machine, such as a wheel loader, an excavator, a dump truck, a backhoe, a motor grader, a material handler, or the like. The term "machine" can also refer to stationary equipment such as a generator that is driven by the engine 104 to generate electricity, a pump or compressor that is driven by the engine 104, or any other stationary drive equipment known in the art. The specific but non-limiting machine 100 illustrated in FIG. 1 is a stationary generator set.

Figure 2:
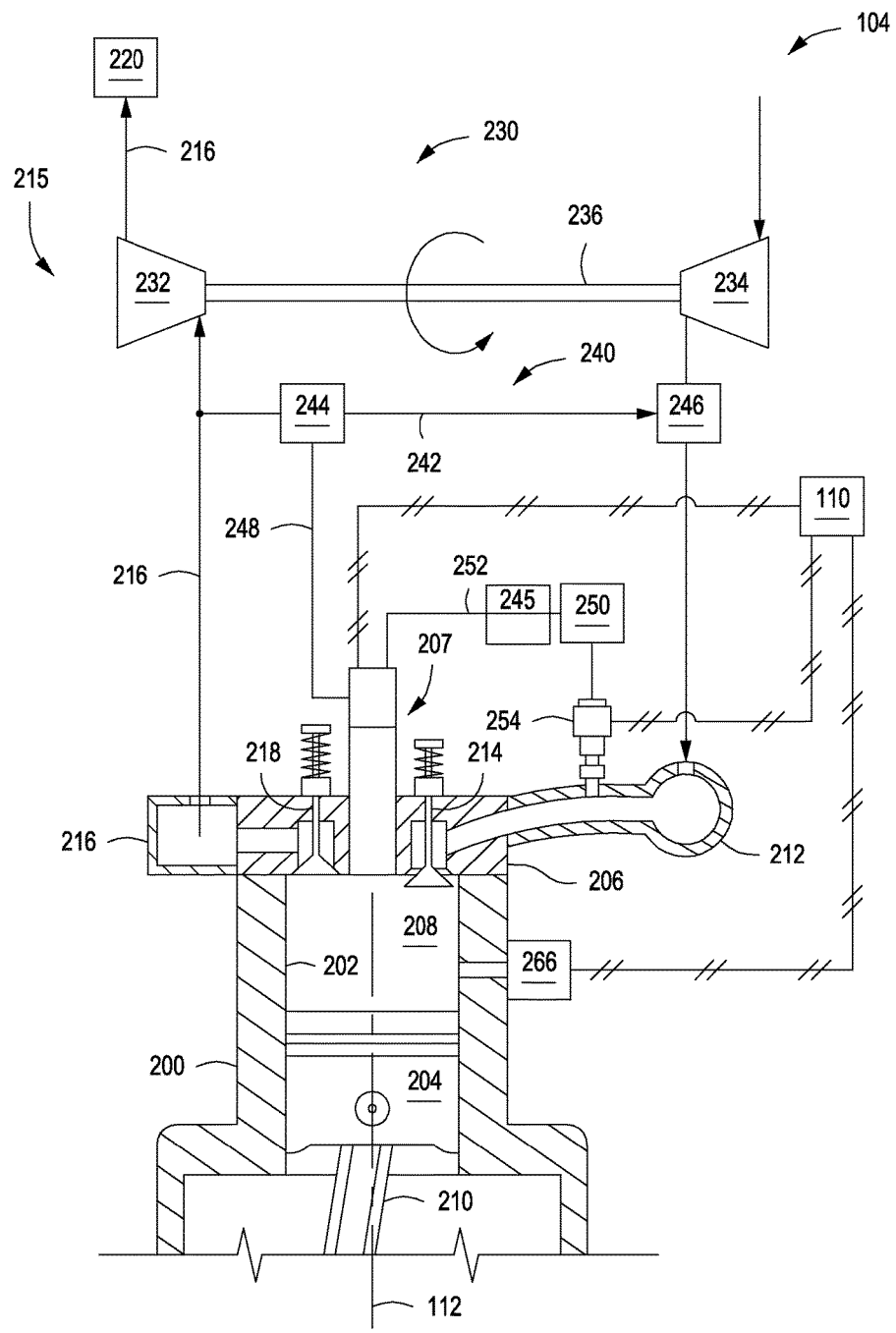
FIG. 2 is a schematic cross-sectional view of an engine in accordance with the disclosure.

FIG. 2 shows a schematic cross-sectional view of a power cylinder in the engine 104, according to an aspect of the disclosure. In the illustrated embodiment, the engine 104 includes a block 200 defining at least one cylinder bore 202. A piston 204 is slidably and sealably disposed within the cylinder bore 202. An open end of the bore 202 is closed by a cylinder head 206, which is connected to the block 200. The engine 104 further includes a pre-chamber assembly 207. the pre-chamber assembly 207 is in fluid communication with the bore 202 and, thus, part of the variable volume defined between the bore 202, the cylinder head 206 and the top of the piston 204. The cross section in FIG. 2 is taken along a plane including a longitudinal axis 112 centered within the bore 202.

The cylinder bore 202, the piston 204, the head 206, and the pre-chamber assembly 207 define, at least partly, a power cylinder or main combustion chamber 208. A volume of the main combustion chamber 208 may vary with the location of the piston 204 relative to the head 206, such that the volume of the main combustion chamber 208 is at a maximum when the piston 204 is located at a bottom dead center (BDC) position along its stroke, and the volume of the main combustion chamber 208 is at a minimum when the piston 204 is located at a top dead center (TDC) position along its stroke.

In the illustrated, exemplary embodiment, the engine 104 operates according to a four-stroke cycle, including an intake stroke, during which the piston 204 moves from the TDC to the BDC positions while at least one intake valve 214 remains at least partially open, a compression stroke, where the piston 204 moves from the BDC towards the TDC positions while the intake valve 214 is closed for at least part of the stroke, an expansion stroke, during which an air/fuel mixture in the cylinder, which is sealed, burns and expands to move the piston 204 from a location close to the TDC position towards the BDC position, and an exhaust stroke, during which at least one exhaust valve 218 is kept at least partially open as the piston 204 moves from the BDC towards the TDC positions to evacuate exhaust gas that is present in the cylinder. Alternatively, the engine 104 may operate according to a two-stroke cycle, including a compression/exhaust stroke (where the piston moves from the BDC to the TDC positions) and an expansion/exhaust/intake stroke (where the piston moves from the TDC towards the BDC positions). It will be appreciated that the engine 104 may also operate according to any known modifications of the four-stroke cycle or the two-stroke cycle. It is also contemplated that the engine 104 may operate according to a late intake closing (LIC) or early intake closing (EIC) type of Miller cycle.

To transfer work to and from the piston, the piston 204 is pivotally connected to a crankshaft in the known fashion via a connecting rod 210. Although only one piston 204 and cylinder bore 202 are shown in FIG. 2, it will be appreciated that the engine 104 may be configured to include any number of pistons and cylinder bores to suit a particular design or application.

During operation, the engine 104 receives a flow of oxidizer such as air or a mixture of air and exhaust gas from an intake duct 212. One or more intake valves 214 selectively fluidly connect the intake duct 212 and the main combustion chamber 208 when open, and fluidly block the intake duct 212 from the chamber 208 when closed. The engine 104 discharges exhaust gas to the exhaust system 215 via an exhaust duct 216. One or more exhaust valves 218 selectively fluidly connect the main combustion chamber 208 with the exhaust duct 216 when open, and fluidly block the exhaust duct 216 from the main combustion chamber 208 when closed. The intake valves 214 and the exhaust valves 218 may be actuated by a cam/push-rod/rocker arm assembly, a solenoid actuator, a hydraulic actuator, or by any other cylinder valve actuator known in the art to open or close intake or exhaust valves. During operation under a Miller cycle, for example, the intake valve may remain open during a compression stroke (LIC), or close before the intake stroke is completed (EIC), to reduce the overall amount of air ingested by the chamber 208.

The exhaust system 215 may include an exhaust aftertreatment system 220 for mechanically and/or chemically treating exhaust gas provided by the main combustion chamber 208 during engine operation. The exhaust aftertreatment system 220 may include a particulate filter, a nitrogen oxide (NOx) conversion module, an oxidation catalyst, an acoustic muffler, combinations thereof, or any other exhaust after-treatment device known in the art.

The engine 104 in the illustrated embodiment further includes a turbocharger 230 having a turbine 232 operably coupled to a compressor 234 via a shaft 236. The turbine 232 receives a flow of exhaust gas via the exhaust duct 216 and extracts mechanical work to operate the compressor 234 via the shaft 236. The compressor 234 compresses incoming air and provides compressed air, which is sometimes referred to as charge air, to the intake duct 212 of the engine 104.

In the embodiment shown, the engine 104 includes an exhaust gas recirculation (EGR) system 240 for recirculating a selectively controlled flow of exhaust gas back into the engine in mixture with incoming air. In the illustrated embodiment, the EGR system 240 includes an EGR conduit 242 in fluid communication with the exhaust duct 216 upstream of the turbine 232 and with the intake duct 212 downstream of the compressor 234. The EGR conduit 242 includes an EGR diverter 244 that fluidly connects the pre-chamber 207 with the EGR conduit 242 via a diverter conduit 248, and an EGR valve 246 that fluidly connects the EGR conduit 242 with the intake duct 212. In the illustrated arrangement, therefore, the diverter conduit 248 fluidly connects the EGR conduit 242 with the pre-chamber assembly 207 such that exhaust gas can flow there-through without passing through the intake duct 212.

During operation, the engine 104 receives combustible fuel from a fuel supply system 250. The fuel supply system 250 may include fuel storage, compressors, pumps, valves, regulators, instrumentation, and/or any other elements known in the art to be useful for supplying a flow of fuel under a controlled pressure and controllable flow to an internal combustion engine. Also included is an optional source of H2 gas 245, which may generate H2 gas from reformation of fuel or may alternatively include an H2 storage tank. The source 245 is configured to supply to the pre-chamber H2 gas selectively during operation via the conduit 252 or independently therefrom. The pre-chamber assembly 207 is disposed in direct fluid communication with the main combustion chamber 208 and receives a flow of fuel from the fuel supply system 250 via a pre-chamber fuel conduit 252 and a pre-chamber fuel valve 253 (see FIG. 3). Accordingly, in the illustrated embodiment, the fuel supply system 250 can fluidly communicate with the pre-chamber assembly 207 along a flow path that does not include the main combustion chamber 208.

A main fuel injector 254 fluidly communicates with the intake duct 212 upstream of the intake valve 214. In an alternative embodiment, the main fuel injector 254 may be disposed in direct fluid communication with the main combustion chamber 208. Accordingly, the main fuel injector 254 may be in fluid communication with the main combustion chamber 208 via a flow path that does not include the pre-chamber assembly 207. Each of the pre-chamber fuel valve 253 and the main fuel injector 254 are operatively coupled to the controller 110 such that fuel can be selectively supplied to the pre-chamber assembly 207 and the main combustion chamber 208 during operation.

The fuel supply system 250 may include sources of different combustible fuels. According to one aspect of the disclosure, the fuel supply system 250 is configured to provide a first fuel to the pre-chamber assembly 207, and a second fuel to the main combustion chamber 208, where the first fuel differs from the second fuel in at least one of supply pressure, matter phase, and chemical composition. Alternatively, the fuel supply system 250 may be configured to deliver the same fuel to each of the pre-chamber assembly 207 and the main combustion chamber 208.

The fuel supply system 250 may be configured to deliver a liquid fuel, a gaseous fuel, or combinations thereof. Liquid fuels may include distillate diesel, biodiesel, dimethyl ether, ethanol, methanol, seed oils, liquefied natural gas (LNG), liquefied petroleum gas (LPG), Fischer-Tropsch derived fuel, combinations thereof, or any other combustible liquid known in the art. Gaseous fuels may include natural gas, methane, propane, hydrogen, carbon monoxide, biogas, syngas, combinations thereof, or any other combustible gas known in the art. It will be appreciated that a gaseous fuel may include inert constituents, such as carbon dioxide, nitrogen, steam, combinations thereof, or any other inert gas known in the art. According to an aspect of the disclosure, the fuel supply system 250 is configured to deliver natural gas. According to another aspect of the disclosure, the fuel supply system 250 is configured to deliver a combustible gas comprising at least 50% methane by mole. According to yet another aspect of the disclosure, the fuel supply system 250 is configured to deliver a fuel with a sufficiently low cetane value, or a sufficiently high octane value, for use in a spark-ignition reciprocating Engine, such as natural gas or gasoline, for example.

The pre-chamber fuel valve 253 is configured to selectively fluidly communicate between the fuel supply system 250 and the pre-chamber assembly 207. For example, the pre-chamber fuel valve 253 may assume one of the following two configurations. According to a first configuration, the pre-chamber fuel valve 253 blocks fluid communication between the fuel supply system 250 and the pre-chamber assembly 207 via the pre-chamber fuel conduit 252. According to a second configuration, the pre-chamber fuel valve 253 fluidly communicates between the fuel supply system 250 and the pre-chamber assembly 207 via the pre-chamber fuel conduit 252.

The pre-chamber fuel valve 253 may include an actuator 260 configured to change the fluid configuration of the pre-chamber fuel valve 253 under the control of the controller 110. The actuator for the pre-chamber fuel valve 253 may include a solenoid actuator, a servo-motor actuator, a hydraulic actuator, a pneumatic actuator, a mechanical actuator, such as, for example a cam actuator, combinations thereof, or any other valve actuator known in the art. The controller 110 may control an amount of fuel delivered to the pre-chamber assembly 207 via the pre-chamber fuel valve 253 by controlling an opening time duration of the pre-chamber fuel valve 253, an effective flow area of the pre-chamber fuel valve 253, or combinations thereof. In an alternative embodiment, a mechanical check valve may be used in place of the pre-chamber fuel valve 253, which operates without input from the controller 110 and is configured to open at a preset pressure to allow fuel to flow there-through to the pre-chamber assembly 207.

Similarly, the main fuel injector 254 is configured selectively fluidly communicate between the fuel supply system 250 and the main combustion chamber 208. For example, the main fuel injector 254 may assume one of the following two fluid configurations. According to a first configuration, the main fuel injector 254 blocks fluid communication between the fuel supply system 250 and the intake duct 212. According to a second configuration, the main fuel injector 254 fluidly communicates between the fuel supply system 250 and the intake duct 212.

The main fuel injector 254 may include an actuator configured to change the fluid configuration of the main fuel injector 254 under the control of the controller 110. The actuator for the main fuel injector 254 may include a solenoid actuator, a hydraulic actuator, a pneumatic actuator, a mechanical actuator, such as, for example a cam actuator, combinations thereof, or any other fuel injector actuator known in the art. The controller 110 may control an amount of fuel delivered to the main combustion chamber 208 via the main fuel injector 254 by controlling an opening time duration of the main fuel injector 254, an effective flow area of the main fuel injector 254, or combinations thereof.

The controller 110 may be in data communication with a user interface for receiving control inputs from an operator of the machine 100. Further, the controller 110 may be in data communication with the engine 104 via one or more data connections for receiving sensor signals from the engine 104, delivering control inputs to the engine 104, combinations thereof, or for transmitting any data known in the art to be relevant to operation of the engine 104. It will be appreciated that any data connections between the controller 110 and any other element of the engine 104 may include wired connections, wireless connections, combinations thereof, or any other data communication means known in the art.

The controller 110 may be any purpose-built processor for controlling the engine 104, the machine 100, or combinations thereof. It will be appreciated that the controller 110 may be embodied in a single housing, or a plurality of housings distributed throughout the machine 100. Further, the controller 110 may include power electronics, preprogrammed logic circuits, data processing circuits, volatile memory, non-volatile memory, software, firmware, combinations thereof, or any other controller structures known in the art.

The engine 104 may optionally include an in-cylinder sensor 266 that is in fluid communication with the main combustion chamber 208, optical communication with the main combustion chamber 208, acoustic communication with the main combustion chamber 208, or combinations thereof. Accordingly, the in-cylinder sensor may sense pressure within the main combustion chamber 208, light emission within the main combustion chamber 208, or both, and may do so at a frequency that is high enough to characterize stability of the combustion process within the main combustion chamber 208.

The in-cylinder sensor 266 may be operatively coupled to the controller 110, such that the in-cylinder sensor 266 may transmit signals indicative of cylinder pressure, in real time, to the controller 110. According to an aspect of the disclosure, the controller 110 is configured to identify an engine knocking or detonation condition based on data input from the in-cylinder sensor 266. According to another aspect of the disclosure, the controller 110 is configured to identify an engine misfiring or insufficient combustion intensity condition based on data input from the in-cylinder sensor 266.

Figure 3:
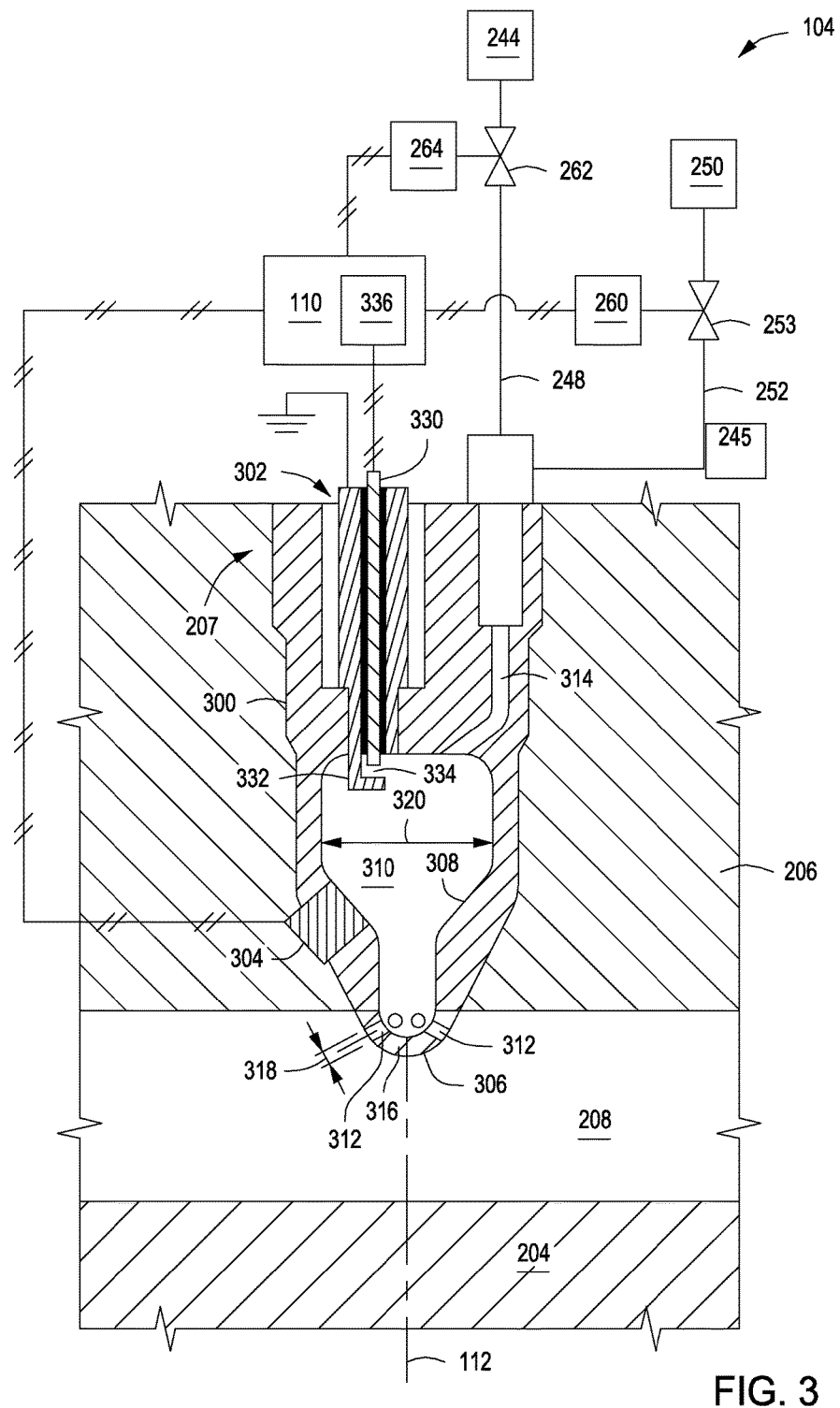
FIG. 3 is a schematic cross-sectional view of a pre-chamber assembly installed in an engine in accordance with the disclosure.

FIG. 3 is a schematic cross-sectional view of a pre-chamber assembly 207 installed in an engine 104, according to an aspect of the disclosure. The pre-chamber assembly 207 includes a body 300 and an ignition energy source 302. Optionally, the pre-chamber assembly 207 may include a heating element 304, the pre-chamber fuel valve 253, or both.

An external surface 306 of the pre-chamber assembly 207 at least partially defines the main combustion chamber 208. According to an aspect of the disclosure, the external surface 306 may project beyond the head 206 into the main combustion chamber 208. An internal surface 308 of the pre-chamber assembly 207 defines a combustion pre-chamber 310 and a plurality of outlet orifices 312, and optionally defines a pre-chamber fluid supply conduit 314.

The outlet orifices 312 extend through a wall 316 of the body 300 and fluidly connect the combustion pre-chamber 310 with the main combustion chamber 208. According to an aspect of the disclosure, a transverse dimension 318 of one or more of the outlet orifices 312 is less than 25% of a transverse dimension 320 of the combustion pre-chamber 310. According to another aspect of the disclosure, a transverse dimension 318 of one or more of the outlet orifices 312 is less than 15% of a transverse dimension 320 of the combustion pre-chamber 310. Accordingly, fluid flow from the combustion pre-chamber 310 to the main combustion chamber 208 via the plurality of outlet orifices 312 is accelerated by a reduction in flow area through the plurality of outlet orifices 312 to form fluid jets projecting into the main combustion chamber 208.

According to an aspect of the disclosure, the ignition energy source 302 is an electric spark plug including an anode 330 and a cathode 332. The anode 330 and the cathode 332 are electrically insulated from one another and define a spark gap 334 within the combustion pre-chamber 310. The cathode 332 may be electrically coupled to a chassis ground of the pre-chamber assembly 207, the engine 104, the machine 100, or combinations thereof. The anode 330 is electrically coupled to the controller 110 via a high voltage source 336, where the controller 110 is configured to apply a voltage difference across the spark gap 334 sufficient to cause an electric spark to arc across the spark gap 334. In turn, the electric spark across the spark gap 334 causes chemical reactions between a fuel and an oxidizer disposed within the combustion pre-chamber 310.

Alternatively or additionally, the ignition energy source 302 may include a laser energy source optically coupled to the combustion pre-chamber 310. The laser energy source may be operatively coupled to the controller 110, and the controller 110 may be configured to cause the laser energy source to transmit a beam of laser light into the combustion pre-chamber 310 for causing chemical reactions between a fuel and an oxidizer disposed within the combustion pre-chamber 310.

In addition to the ignition energy source 302, the pre-chamber assembly 207 may include a heating element 304 disposed in thermal communication with the combustion pre-chamber 310. According to an aspect of the disclosure, the heating element 304 is an electrical resistance heater that is operatively coupled to the controller 110, where the controller 110 is configured to create a desired heat flux into the combustion pre-chamber 310 such that a desired temperature is reached within the combustion pre-chamber 310. The heating element 304 may be advantageously operated to promote medium temperature combustion kinetics in a range of about 750 to 950 deg. K in the fluids present in the pre-chamber. It is contemplated that a surface temperature or the heating element 304 may be higher.

During engine operation, the pre-chamber diverter conduit 248 is configured to be selectively placed in fluid communication with the EGR system 240 or the EGR diverter 244 via a pre-chamber EGR valve 262. Accordingly, the pre-chamber EGR valve 262 selectively fluidly connects the EGR loop 240 and the pre-chamber assembly 207 via the pre-chamber diverter conduit 248. For example, the pre-chamber EGR valve 262 may assume one of the following two fluid configurations. According to a first configuration, the pre-chamber EGR valve 262 blocks fluid communication between the EGR loop 240 and the pre-chamber assembly 207. According to a second configuration, the pre-chamber EGR valve 262 fluidly connects the EGR loop 240 and the pre-chamber assembly 207.

The pre-chamber EGR valve 262 may include an actuator 264 configured to change the fluid configuration of the pre-chamber EGR valve 262 under the control of the controller 110. The actuator 264 for the pre-chamber EGR valve 262 may include a solenoid actuator, a servo-motor actuator, a hydraulic actuator, a pneumatic actuator, a mechanical actuator, such as, for example a cam actuator, combinations thereof, or any other valve actuator known in the art. The controller 110 may control an amount of exhaust gas delivered to the pre-chamber assembly 207 via the pre-chamber EGR valve 262 by controlling an opening time duration of the pre-chamber EGR valve 262, an effective flow area of the pre-chamber EGR valve 262, or combinations thereof.

The internal surface 308 of the body 300 may define a pre-chamber fluid supply conduit 314 that is in fluid communication with the combustion pre-chamber 310 and the pre-chamber fuel valve 253, the pre-chamber EGR valve 262, or both. Accordingly, the pre-chamber fuel valve 253 selectively fluidly connects the fuel supply system 250 and the combustion pre-chamber 310 via the pre-chamber fluid supply conduit 314, and the pre-chamber EGR valve 262 selectively fluidly connects the EGR loop 240 and the combustion pre-chamber 310 via the pre-chamber fluid supply conduit 314. Although FIG. 3 shows the pre-chamber fluid supply conduit 314 integrated within the body 300, it will be appreciated that the pre-chamber fluid supply conduit 314 could also be embodied as a separate conduit external to the body 300 that passes through the body 300 to fluidly connect to the pre-chamber 310.

Although FIG. 3 shows each of the pre-chamber fuel valve 253 and the pre-chamber EGR valve 262 each fluidly coupled to a single pre-chamber fluid supply conduit 314, it will be appreciated that the pre-chamber fuel valve 253 and the pre-chamber EGR valve 262 may each be fluidly coupled to the combustion pre-chamber 310 through separate fluid conduits arranged fluidly in parallel with one another.

INDUSTRIAL APPLICABILITY

The present disclosure is applicable to internal combustion engines and, in particular, to engines operating using a HCCI combustion system that includes a combustion pre-chamber. The disclosure particularly provides systems and methods for controlling and stabilizing HCCI combustion over a wider range of environmental and usage conditions than what was previously possible. Two embodiments are described herein for controlling engine operation.

In the first embodiment, uncooled EGR is introduced along with fuel into the pre-chamber to achieve a more stable, constant temperature range for enhancing medium temperature combustion resulting in increased production of $H_2O_2$. The increased $H_2O_2$ thus created in the pre-chamber breaks down to OH radicals during compression, which initiates HCCI combustion in the pre-chamber. Further, because of the uncooled EGR introduction into the pre-chamber, a temperature range control is compressed in the pre-chamber making it easier for managing temperature history. Traditional engines operating with HCCI combustion in the main chamber have to contend with very high temperature ranges (i.e. intake manifold to ignition temperature), which makes combustion phasing difficult when there is variation in the intake manifold temperature. In accordance with the first embodiment, uncooled EGR gas is introduced into the pre-chamber along with fuel during the gas exchange event. This generates $H_2O_2$, which dissociates during the compression stroke into OH radicals at about 1,000 to 1,100 degrees Kelvin. The OH radicals react to cause autoignition of the air/fuel mixture in the main cylinder without the need for a spark. This occurs during normal operation.

While the engine is operating in accordance with the first embodiment, at times when ignition occurs too late for various reasons including transient delays when the engine is accelerating and insufficient EGR is available for the pre-chamber, ignition can be advanced by multiple sparks provided by an ignition source within the pre-chamber in the presence of fuel such as CH4 for creation of H2 in the pre-chamber. Additionally, ignition can also be advanced by supplying H2 gas to the pre-chamber directly. Similarly, when ignition occurs prematurely due to an over-supply of EGR and fuel in the pre-chamber, for example, when the engine is decelerating, then either LIC or EIC Miller cycle is used to lower the main combustion chamber temperature, which acts to cool the pre-chamber during the compression stroke. Ignition timing is sensed by a controller, for example, using an in-cylinder pressure sensor, which controller then dynamically and in real time determines whether ignition should be advanced or retarded as described above while maintaining a stable HCCI mode of combustion.

In the second embodiment, H2 is introduced into the pre-chamber along with fuel to provide H and OH radicals for initiating HCCI combustion in the pre-chamber. The engine is thus operated in a stable fashion over a broad range of operating conditions and also during transient change conditions. In accordance with the second embodiment, hydrogen gas from a fuel reformer or from a tank is introduced into the pre-chamber along with fuel during the gas exchange event. The hydrogen gas H2 that was introduced into the pre-chamber, along with H2 that may have been created in the pre-chamber, breaks down into H and OH radicals at about 1,000 to 1,100 degrees Kelvin. The OH radicals, like in the first embodiment, react to cause autoignition of the air/fuel mixture in the pre-chamber without the need for a spark. This occurs during normal operation.

While the engine is operating in accordance with the first embodiment, at times when ignition occurs too late for various reasons including transient delays when the engine is accelerating and insufficient EGR is available for the pre-chamber, ignition is advanced by multiple sparks provided by an ignition source within the pre-chamber. In this instance, fuel such as CH4 is supplied to the pre-chamber and, as the compression stroke is carried out, oxygen enters the pre-chamber. In the presence of multiple sparks, partial oxidation of the CH4 produces CO+2H2, which produces additional hydrogen that helps advance the combustion. Similarly, when ignition occurs prematurely due to an over-supply of EGR and fuel in the pre-chamber, for example, when the engine is decelerating, then either LIC or EIC Miller cycle is used to lower the main combustion chamber temperature, which acts to cool the pre-chamber during the compression stroke and slow down the breakdown of the $H_2O_2$ into OH radicals. Ignition timing is sensed by a controller, for example, using an in-cylinder pressure sensor, which controller then dynamically and in real time determines whether ignition should be advanced or retarded as described above while maintaining a stable HCCI mode of combustion.

Operation of an engine 104 will now be described with reference to FIGS. 2 and 3. Near TDC of an intake stroke, the exhaust valves 218 close and the intake valves 214 open. As the piston 204 translates within the bore 202 toward BDC, oxidizer from the intake duct 212 and fuel from the main fuel injector 254 are drawn into the main combustion chamber 208. It will be appreciated that the main fuel injector 254 may admit fuel into the main combustion chamber 208 over a period of time spanning only a portion of the entire intake stroke. Fuel, oxidizer, or both, from the main combustion chamber 208 may flow into the combustion pre-chamber 310 via the outlet orifices 312 during the intake stroke by diffusion, convection driven by charge motion within the main combustion chamber 208, or other mass transport process.

Near BDC of a following compression stroke, the intake valves 214 close and the exhaust valves 218 remain closed. As the piston 204 translates within the bore 202 toward TDC, oxidizer and fuel from the main fuel injector 254 are mixed and compressed within the main combustion chamber 208. Further, compression within the main combustion chamber 208 causes a flow of oxidizer and fuel from the main fuel injector 254 to flow from the main combustion chamber 208 into the combustion pre-chamber 310 via the plurality of outlet orifices 312. According to an aspect of the disclosure, the only source of oxidizer for the combustion pre-chamber 310 is oxidizer originating from the intake duct 212 and flowing into the combustion pre-chamber 310 via the plurality of outlet orifices 312, and/or excess oxidizer that is carried into the pre-chamber with the EGR gas introduced into the pre-chamber; the excess oxidizer in this condition results from the relatively lean fuel/air mixture that the engine burns in the main chamber.

The relative proportions of fuel and oxidizer entering the combustion pre-chamber 310 via the plurality of outlet orifices 312 at any given time during the compression stroke may depend upon timing and flow rate of fuel from the main fuel injector 254, how well the fuel and the oxidizer are mixed within the main combustion chamber 208, or both. Thus, the relative proportions of fuel and oxidizer within the combustion pre-chamber 310 during the compression stroke may vary with time.

In either the first or second embodiments in accordance with the disclosure, fuel may be delivered directly to the combustion pre-chamber 310 via the pre-chamber fuel valve 253 and the pre-chamber fluid supply conduit 314 during the intake stroke, the compression stroke, or both. The same goes for uncooled EGR or H2 gas, which are also provided to the pre-chamber. Accordingly, a concentration of fuel in the fuel-oxidizer mixture disposed within the combustion pre-chamber 310 may be affected by residual gas remaining in the combustion pre-chamber 310 after the previous exhaust stroke, oxidizer flowing from the main combustion chamber 208 into the combustion pre-chamber 310, fuel flowing from the main combustion chamber 208 into the combustion pre-chamber 310, and fuel flowing from the pre-chamber fuel valve 253 directly into the combustion pre-chamber 310, and uncooled EGR or H2 gas. The pre-chamber fuel valve 253 may deliver fuel directly to the combustion pre-chamber 310 over any time period between about 500 degrees crank angle before TDC of the compression stroke and about the time of closing the intake valves 214, for example. Alternatively or additionally, given a fuel supply with sufficient supply pressure, the pre-chamber fuel valve 253 may deliver fuel directly to the combustion pre-chamber 310 over any time period between about the time of exhaust valves 218 closing near the end of the exhaust stroke and about TDC of the compression stroke.

In accordance with the first embodiment, exhaust gas may be delivered directly to the combustion pre-chamber 310 via the pre-chamber EGR valve 262 and the pre-chamber fluid supply conduit 314 during the intake stroke, the compression stroke, or both. Accordingly, a concentration of fuel in the fuel-oxidizer mixture disposed within the combustion pre-chamber 310 may be affected by residual gas remaining in the combustion pre-chamber 310 after the previous exhaust stroke, oxidizer flowing from the main combustion chamber 208 into the combustion pre-chamber 310, fuel flowing from the main combustion chamber 208 into the combustion pre-chamber 310, and fuel flowing from the pre-chamber fuel valve 253 directly into the combustion pre-chamber 310, and exhaust gas flowing from the EGR loop 240 directly into the combustion pre-chamber 310 via the pre-chamber EGR valve 262.

The pre-chamber EGR valve 262 may deliver exhaust gas directly to the combustion pre-chamber 310 over any time period between about 500 degrees crank angle before TDC of the compression stroke and about the time of closing the intake valves 214, for example. Alternatively or additionally, given an EGR supply with sufficient supply pressure, the pre-chamber EGR valve 262 may deliver exhaust gas directly to the combustion pre-chamber 310 over a portion of the compression stroke.

In accordance with the second embodiment, H2 gas may be delivered directly to the combustion pre-chamber 310 from a fuel reformer or for an external source such as a tank, as is known, during the intake stroke, the compression stroke, or both. Accordingly, a concentration of fuel in the fuel-oxidizer mixture disposed within the combustion pre-chamber 310 may be affected by residual gas remaining in the combustion pre-chamber 310 after the previous exhaust stroke, oxidizer flowing from the main combustion chamber 208 into the combustion pre-chamber 310, fuel flowing from the main combustion chamber 208 into the combustion pre-chamber 310, and fuel flowing from the pre-chamber fuel valve 253 directly into the combustion pre-chamber 310, exhaust gas flowing from the EGR loop 240 directly into the combustion pre-chamber 310 via the pre-chamber EGR valve 262, and H2 gas provided directly to the pre-chamber.

During the reaction of chemicals in the pre-chamber for the formation of OH radicals in the first or second embodiment, as described above, the controller will continuously monitor cylinder pressure to determine the delayed or advanced ignition timing that may result from an imbalance of constituents within the pre-chamber. When ignition occurs prematurely, increasing degrees of valve timing delays in accordance with a Miller cycle may be implemented to delay combustion. Similarly, when ignition is delayed, ignition will be advanced by forcing the creation of OH radicals, for example, by implementing multiple sparks to create H2 or by otherwise supplying H2 to the pre-chamber.

When advancing combustion timing, H2 is formed from a flow of exhaust gas directly to the combustion pre-chamber 310 via a path that does not include the main combustion chamber 208 may act to further promote formation of the aforementioned beneficial species by promoting additional reaction pathways to CO and H2, including, but not limited to, steam-methane reforming, carbon dioxide (CO2) reforming, and partial oxidation reforming, some of which may require multiple sparks or, in general, energy input in pulses into the pre-chamber. Exemplary reactions for steam-methane reforming, CO2 reforming, and partial oxidation reforming, are included below in Reaction 1, which illustrates steam methane reforming, Reaction 2, which illustrates CO2 reforming of methane, and Reaction 3, which illustrates partial oxidation reforming, respectively.

$$CH_4 + H_2O \rightarrow CO + 3H_2 \qquad \text{Reaction 1}$$

$$CH_4 + CO_2 \rightarrow 2CO + 2H_2 \qquad \text{Reaction 2}$$

$$CH_4 + \tfrac{1}{2}O_2 \rightarrow CO + 2H_2 \qquad \text{Reaction 3}$$

After formation of the H2 is complete, the H2 formed will aid auto-ignition in the pre-chamber as the piston approaches TDC. H2 gas breakdown will occur during the compression stroke when the temperature in the pre-chamber increases due to the pressure increase to a temperature of about 1050 deg. K or above. During this period, multiple sparks and/or a heat input into the pre-chamber will rapidly increase formation of OH and H radicals from breakdown of the H2 gas as illustrated in Reactions 4, 5 and 6 below:

$$H_2 \rightarrow H + H \qquad \text{Reaction 4}$$

$$H_2 + O_2 \rightarrow HO_2 + H \qquad \text{Reaction 5}$$

$$H_2 + O \rightarrow H + OH \qquad \text{Reaction 6}$$

The rapid formation of radicals in this fashion is the same for the first and second embodiments. In the first embodiment, exhaust gas delivered directly to the combustion pre-chamber 310 via the pre-chamber EGR valve 262 may promote generation of CO and H2 via operation of the ignition energy source 302 by promoting concentrations of reactants, such as H2O, O2, and CO2, within the combustion pre-chamber 310 before operation of the ignition energy source 302.

In accordance with the present disclosure, it is contemplated that a medium temperature combustion produces H2O2 as H and O react in accordance with the relation: H+O2+M=HO2+M when the temperature in the pre-chamber is adjusted by addition of uncooled EGR to be at about 750 or 950 deg. K in the presence of fuel such as CH4. The HO2 then reacts in accordance with the following relation: RH+M=R+H2O2 at an elevated temperature, e.g., during the compression stroke, OH radicals are formed according to the following relation: H2O2+M=2OH+M. M or R, in the above relations, may be a donor of a hydrogen atom such as CH4, CH2O2, or any other appropriate compound or species. HCCI combustion in the pre-chamber will begin when sufficient concentration of OH radicals is present and dispersed within the pre-chamber and the temperature rises at above around 1050 deg. K during compression.

Figure 4:
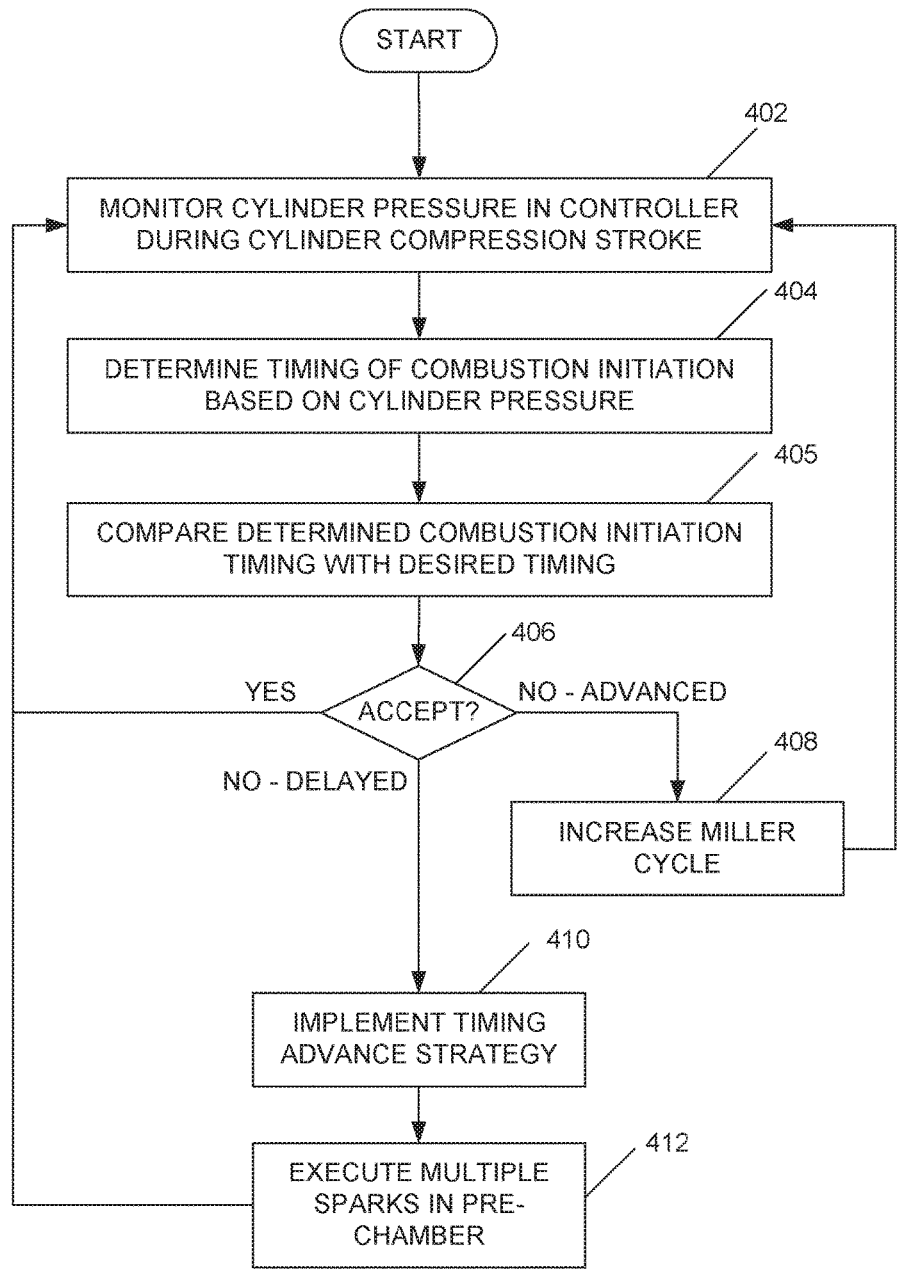
FIG. 4 is a flowchart for a method of operating an engine in accordance with the disclosure.

A flowchart for a method or controlling a timing of an engine operating in a HCCI combustion mode in accordance with the disclosure is shown in FIG. 4. At 402, an engine cylinder undergoes a compression stroke, during which a cylinder pressure in the main chamber is monitored by a controller. The exact timing of combustion initiation is determined at 404 by the controller and compared at 405 to a desired ignition timing. This can be accomplished by a heat release determination, or other appropriate methods. When the exact timing is within an acceptable range of the desired ignition timing, no change in engine operation with respect to ignition timing is made and the engine operates normally at 406 and the monitoring step at 402 is repeated. When the exact timing is determined to be premature, the controller implements an increasing Miller cycle type of operation at 408, which includes either delaying closure of intake valves of the cylinder until after the compression stroke has started (LIC) or closing of the intake valves before the intake stroke has completed (EIC). The process then continues at 404 to determine if further intervention is required.

When the exact timing is determined to be delayed, the controller implements a timing advance strategy at 410, which includes producing H2, or supplying H2 from an external source, into the pre-chamber. This is accomplished by either executing multiple sparks in the pre-chamber at 412 in the presence of EGR, or supplying H2 from an external source. The process then continues at 404 to determine if further intervention is required. The timing of multiple sparks includes at least five energy pulses, and it should be appreciated that any energy pulse of the plurality of energy pulses could be a spark arcing across the spark gap 334 of a spark plug, a pulse of laser light, or any other ignition energy pulse known in the art, after H2 is present in the pre-chamber. According to an aspect of the disclosure, a duration of each energy pulse of the plurality of energy pulses is less than five (5) degrees crank angle. According to another aspect of the disclosure, an energy for each ignition spark is less than about 100 mJ.

Any of the methods or functions described herein may be performed by or controlled by the controller 110. Further, any of the methods or functions described herein may be embodied in a machine-readable non-transitory medium for causing the controller 110 to perform the methods or functions described herein. Such machine-readable non-transitory media may include magnetic disks, optical discs, solid state disk drives, combinations thereof, or any other computer-readable non-transitory medium known in the art. Moreover, it will be appreciated that the methods and functions described herein may be incorporated into larger control schemes for an engine, a machine, or combinations thereof, including other methods and functions not described herein.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

I claim:

1. A method for operating an internal combustion engine, comprising:

operating at least one cylinder pre-chamber in a homogeneous charge compression ignition (HCCI) combustion mode;

providing an air/fuel mixture in the at least one cylinder pre-chamber that is fluidly connected to at least one engine cylinder;

creating H and OH radicals in the at least one cylinder pre-chamber to achieve an ignition in the at least one cylinder pre-chamber during a compression stroke of the at least one engine cylinder;

monitoring a cylinder parameter to determine an ignition in the at least one engine cylinder, and comparing the ignition to a desired ignition timing;

determining that the ignition is retarded relative to the desired ignition timing, and advancing ignition of the at least one engine cylinder by providing Hydrogen gas ($H_2$) into the at least one cylinder pre-chamber from an external source and/or by creating conditions favorable for the following reactions to occur to form $H_2$ within the at least one cylinder pre-chamber:

$CH_4 + H_2O \rightarrow CO + 3H_2$;

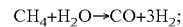

$CH_4 + CO_2 \rightarrow 2CO + 2H_2$; and

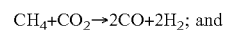

$CH_4 + \frac{1}{2}O_2 \rightarrow CO + 2H_2$;

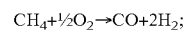

wherein creating the conditions favorable is accomplished by selectively providing $CH_4$ directly to the at least one cylinder pre-chamber from a fuel supply, selectively providing $CO_2$ and $H_2O$ to the at least one cylinder pre-chamber from an exhaust gas recirculation (EGR) valve, and selectively providing $O_2$ to the at least one cylinder pre-chamber from an intake duct of the internal combustion engine; and, following $H_2$ formation in the at least one cylinder pre-chamber, creating conditions favorable for the following reactions to occur in the at least one cylinder pre-chamber:

$H_2 \rightarrow H + H$;

$H_2 + O_2 \rightarrow HO_2 + H$; and

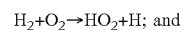

$H_2 + O \rightarrow H + OH$;

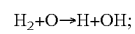

igniting the air/fuel mixture in the at least one cylinder pre-chamber in the presence of H and OH, an initiation of ignition occurring at an advanced ignition timing; and determining that the ignition is advanced relative to the desired ignition timing, and delaying the ignition for a subsequent ignition in the at least one engine cylinder by cooling the at least one cylinder pre-chamber and the at least one engine cylinder before the subsequent ignition.

2. The method of claim 1, wherein causing the cooling is accomplished by using an electronic controller to command a variable valve activation device to increase an amount of Miller effect in the at least one engine cylinder, and wherein the at least one engine cylinder undergoes at least four strokes during engine operation including an intake stroke, a compression stroke, an expansion or power stroke, and an exhaust stroke.

3. The method of claim 2, wherein the Miller effect is either a late intake closing (LIC) Miller effect, in which the electronic controller commands the variable valve activation device to keep at least one intake valve open during at least a portion of the compression stroke of the at least one engine cylinder, or an early intake closing (EIC) Miller effect, in which the electronic controller commands the variable valve activation device to close the at least one intake valve over at least a portion of the intake stroke of the at least one engine cylinder.

4. The method of claim 3, wherein the creation of the H and OH radicals in the at least one cylinder pre-chamber is accomplished by creating a temperature between about 750 to 950 deg. K in the at least one cylinder pre-chamber during the compression stroke, and providing appropriate compounds in the at least one cylinder pre-chamber such that the following reactions can take place:

$$H+O_2+M=HO_2+M,$$

where M is a hydrogen atom donor species, $$RH+HO_2=R+H_2O_2,$$

where R is a hydrogen atom donor species;
raising the temperature to about 1050 deg. K, or above, in the at least one cylinder pre-chamber and then creating the OH radicals in accordance with the following reaction:

$$H_2O_2+M=2OH+M.$$

5. The method of claim 1, wherein $H_2$ gas is provided directly to the at least one cylinder pre-chamber from the external source.

6. The method of claim 5, further comprising drawing the $H_2$ gas from a hydrogen storage tank, and supplying the $H_2$ gas to the at least one cylinder pre-chamber.

7. The method of claim 5, further comprising operating a fuel reform module to produce the $H_2$ gas, and supplying the $H_2$ to the at least one cylinder pre-chamber.

* * * * *